(12) United States Patent
Sneyders

(10) Patent No.: US 8,484,080 B2
(45) Date of Patent: Jul. 9, 2013

(54) SYSTEM AND METHOD FOR SOCIAL PRODUCT INFORMATION SHARING

(75) Inventor: Dave Sneyders, Wilrijk (BE)

(73) Assignee: Nahu BVBA, Rijkevorsel (BE)

( * ) Notice: Subject to any disclaimer, the term of this patent is extended or adjusted under 35 U.S.C. 154(b) by 161 days.

(21) Appl. No.: 12/800,211

(22) Filed: May 10, 2010

(65) Prior Publication Data

US 2011/0276406 A1    Nov. 10, 2011

(51) Int. Cl.
*G06Q 30/00*   (2012.01)

(52) U.S. Cl.
USPC ...................................... 705/14.4; 705/14.66

(58) Field of Classification Search
USPC ........................ 705/14, 14.4, 14.66
See application file for complete search history.

(56) References Cited

U.S. PATENT DOCUMENTS

| | | | |
|---|---|---|---|
| 4,345,315 A * | 8/1982 | Cadotte et al. ................ 705/7.32 |
| 5,794,210 A * | 8/1998 | Goldhaber et al. ......... 705/14.69 |
| 5,950,172 A * | 9/1999 | Klingman ..................... 705/27.1 |
| 6,970,831 B1 * | 11/2005 | Anderson et al. ............ 705/7.32 |
| 7,363,214 B2 * | 4/2008 | Musgrove et al. ................ 704/9 |
| 2001/0037206 A1 * | 11/2001 | Falk et al. ......................... 705/1 |
| 2002/0049770 A1 * | 4/2002 | Mayadas .................... 707/104.1 |
| 2005/0034071 A1 * | 2/2005 | Musgrove et al. ............. 715/530 |
| 2006/0042483 A1 * | 3/2006 | Work et al. ...................... 101/91 |
| 2007/0226047 A1 * | 9/2007 | Ward .............................. 705/10 |
| 2008/0109491 A1 * | 5/2008 | Gupta ........................ 707/104.1 |
| 2010/0145792 A1 * | 6/2010 | Worthen et al. ............ 705/14.42 |
| 2011/0173191 A1 * | 7/2011 | Tsaparas et al. .............. 707/723 |

OTHER PUBLICATIONS

Webopedia Computer Dictionary: definition of the term client.
Wikipedia, the free encyclopedia: definition of the term server.*
Webopedia Computer Dictionary: definition of the term client. 2012.*
Wikipedia, the free encyclopedia: definition of the term server. 2012.*

* cited by examiner

*Primary Examiner* — Matthew L Hamilton
(74) *Attorney, Agent, or Firm* — Brian R. Galvin; Galvin Patent Law LLC

(57) ABSTRACT

A system for electronic commerce, comprising a portal server executing on a digital computer, coupled to a digital packet network and an analysis software executing on a server or another digital computer(s), adapted to receive information from a user via the digital packet network, said information including at least a plurality of data elements pertaining to products owned, used, or sought by the user, wherein the received information is made available to the analysis software, which computes a maturity score for the user based at least in part on the received information, and wherein the portal server uses at least a maturity score to order a selection of information be provided to the user, and wherein at least some of the received information is made available to a plurality of external systems based at least in part on privacy settings established by or for the particular user, is disclosed.

2 Claims, 7 Drawing Sheets

SYSTEM AND METHOD FOR SOCIAL PRODUCT INFORMATION SHARING

BACKGROUND OF THE INVENTION

1. Field of the Invention

The present invention is in the field of e-commerce particularly as it pertains to electronic platforms to facilitate targeted marketing based on deep user profiles, and consumer end-user feedback and interaction with both retailers and other consumers.

2. Discussion of the State of the Art

Electronic commerce has become embedded in cultures throughout the developed world. At the same time consumers worldwide have incorporated Internet communication as an integral part of their lifestyle. Social networks such as Facebook™ and MySpace™ and business orientated networking platforms such as LinkedIn™ continue to grow in popularity. Blogging platforms such as Twitter™ or Google™ Buzz provide additional ways for users to keep in touch with friends and family and to make new social contacts worldwide. E-commerce platforms such as eBay™ and Amazon.com™ allow retailers easy access to consumers and even allow retail consumers to become sellers. The popularity of electronic social networks and electronic commerce has led to profound changes within our culture, particularly concerning production and consumption of advertisements.

The online advertising market continues to grow and become a larger portion of total advertising revenue. Currently, the total US advertising market is around $100 billion with the online portion now accounting for approximately $24 billion of that total. Most of the online advertising market is based on page and/or search content. There is limited ability to target a consumer beyond knowing search and site preferences. Click through rates on Internet advertisements increase dramatically when the advertisements can be more specifically targeted to the consumer type most likely to be interested in a specific product group. Individual consumers better tolerate banner, pop up and video advertisements on their favorite Internet sites if the ads are more relevant to the individual consumer and less randomly placed.

Both retailers and end user consumers benefit from the ability to see product reviews by individuals that have recently purchased or used a specific product or service. In the present art any feedback or review available could be difficult to find and to trust as this information may be spread out over a number of individual sites and there is little if any control over who can input material for reviews. For example a retailer may be unaware that a consumer has found dissatisfaction with their product and has blogged about it on a third party site which the retailer is not monitoring. A consumer would have no reason to trust a review in a particular site that could have been embellished by the very retailer that sells the product or service. An individual unhappy customer could skew the ratings for a particular product by repeatedly giving extremely negative feedback on a particular site. An individual may give a glowing review for a product they just purchased but several months down the road may have had numerous problems with the product and if queried now would give a much different review and yet the glowing review may be left on particular site for many months or years without any follow up. Although there are mechanisms for feedback between retailers and consumers and between consumers themselves in the present art, there is little control over the process and feedback is widely scattered over multiple sites and often not trustworthy making the information less valuable.

While the current art of social networks and e-commerce have the ability to collect limited data about individual consumers, the information is incomplete and often out of date and may be scattered over multiple platforms. Normally the data profiling an individual consumer would not include feedback from that consumer on products he or she is using. There would be little chance that an e-retailer could specifically target potential customers who are in fact looking for a specific product or service. Any data collected needs to be updated over time as the individual consumer's circumstances change. In the current art the consumer has little if any incentive to give more detailed information or feedback that might be useful for the retailer. Other individuals in a consumer's social network might be very much influenced by purchasing decisions and product reviews from peers. In the current art the retailer is for the most part completely blind to positive or negative influences their customers have within their own social networks.

Another challenge in the art today is the balance of privacy and value. Consumers seek to maintain their privacy to some extent, but are desirous of realizing the value of many of the new online services, most of which require them to divulge personal information (or to allow the service provider to observe a significant portion of their online activities, which amounts to the same thing).

In summary, while both consumers and retailers are adapting to the paradigm of the Internet world there needs to be a better way to facilitate interactions between retailers and consumers and between consumers themselves that provides benefits for the retailer, the consumer and the advertising industry, while maintaining a reasonable balance (and a consumer-controlled balance) between privacy and value. In the current art there considerable limitations on the ability for retailers to deliver deeply targeted advertisements to the consumer, to get reliable feedback from the consumer and for consumers to efficiently get trusted advice from other consumers who are using or have purchased particular products.

SUMMARY OF THE INVENTION

In order to address the problems described above, the inventor provides a system for producing a rich and dynamic customer profile (also referred to herein as a "deep profile"), that is built with a customer's full cooperation and knowledge, and that allows retailers to deliver deeply targeted advertisements to these consumers. The invention will enable companies to deliver the right products and services to the right prospective client at the right time. The invention builds and maintains a dynamic database of what participating consumers purchase, what other items they own, what items they may need or desire, where and from whom items were purchased, and feedback on how consumers feel about purchased products over time. Through integration with social networks, a platform according to the invention knows who each consumer is and how they fit in the social universe. The invention also provides a platform for detailed and reliable customer product reviews and comparison tools that benefit consumers as well as companies. Because the invention provides benefits to both retailers and consumers both parties have incentives to fully participate in the flow of information. Data is updated continually both through active consumer participation and through passive tracking as consumers go about normal online activities, such as social networking and browsing. The invention aims to improve customer service and help companies better understand their customers.

Another aim of the invention is to allow consumers to resell and list products they have that others in the network might be looking for.

In an embodiment the invention collects information from consumers' search engine inquiries, social networks, online retail transactions, e-mail, and IM networks, and even locations visited in both the real and virtual worlds. Along with passive collection of this data systems according to the invention regularly query consumers for small bites of information and feedback in a manner that is convenient and helpful. The invention seeks to keep all information relevant by asking if information has changed and asking new questions over time. An embodiment of the invention calculates a maturity score for each consumer based on depth and quality of data collected and on level of participation by a given consumer in giving feedback. In various embodiments the maturity score takes into account completeness of profiles, quality, balance, and quantity of feedback, size and aggregate maturity (in the sense described herein) of each consumer's social networks, updating of information over time, and so forth. It will be appreciated that there are many other items of interest that can be used to modify a user's maturity rating; the examples just listed serve to illustrate but should not be taken as limiting the scope of the invention.

Embodiments of the invention incentivize consumer participation by giving points (or other incentives) as consumers' profiles mature and are updated. These points can be redeemed for discounts on products and services offered by participating companies. In an embodiment, a maturity score is dynamically calculated for a consumer profile based on quantity, quality, and balance of feedback from individual consumer clients. Some of this feedback is generated by surveys and detailed product reviews and direct consumer input. Other data may be obtained passively in an embodiment where an enrolled consumer client allows for this, by appropriately setting consumer profile preferences. Passive data may include location data from registered devices used by a consumer, online transactions, search engine queries, social contacts, and event data in various embodiments.

The consumer also benefits by having access to trusted and detailed product reviews and in another embodiment, real time advice from other consumers in a network, and by having an ability to buy and sell items with other consumers within a network. An example of this would be an embodiment that allows for an enrolled consumer to snap a picture of an item he is looking to purchase and getting detailed feedback from other consumers in addition to retailers' solicitations. In this example another consumer might offer to sell the photographed item that she no longer needs and is willing to part with, or detailed product review information might convince the inquiring consumer to seek a different product. A further incentive for customers to enroll would be an ability to see prices that others have recently paid and to initiate retailer competition for their business. Product comparison tools in various embodiments are also available to enrolled consumers, giving further benefit for participation in programs operating according to the invention.

The ability to deliver targeted deep profile ads to consumers with specific profiles and to be able to track effectiveness of those ads is a huge benefit for retailer clients. An additional benefit for retailer clients is feedback exemplary platforms provide from both customers and potential customers. This feedback is updated over time, providing a continual flow of information that companies can use to improve their products and customer service. The platform also provides a communication network between retailers and consumers whereby warranty information, product recall notices, new product innovations, and the like can be easily disseminated directly from companies to customers.

The ability to generate and dynamically update detailed consumer profiles vastly improves the ability to deliver targeted advertisements to profiled consumers. Both consumer clients and retailer clients benefit from the flow of information.

In a preferred embodiment of the invention, an e-commerce system, comprising a portal server executing on a digital computer and coupled to a digital packet network and an analysis software executing on the server system or executing on another digital computer and adapted to communicate with the server across the digital packet network, is disclosed. According to the embodiment, the portal server is adapted to receive information from a user via the digital packet network, said information including at least a plurality of data elements pertaining to products owned, used, or sought by the user. Additionally, the received information is made available to the analysis software, and the analysis software computes a maturity score for the user based at least in part on the received information provided to the analysis software, said maturity score further being provided to the portal server. Finally, the portal server uses at least a maturity score to order a selection of information to be provided to the user.

In a further embodiment of the invention, the analysis software further computes a user profile based at least in part on the received information and on the history of information updates received from the user by the portal server. In another further embodiment of the system, the e-commerce system further comprises an advertising server coupled to the portal server or operating as a software module within the portal server. According to the embodiment, the advertising server selects from among a plurality of available advertisements particular advertisements to be displayed to the user, based at least in part the user profile. In some embodiments of the invention, the digital packet network is the Internet.

In another preferred embodiment, the invention further comprises a security server coupled to the portal server or operating as a software module within the portal server. According to the embodiment, the security server carries out an authentication process to confirm an identity of a user before receiving information from the user.

In some embodiments of the invention, the portal server is adapted to receive user information from a third-party server or web site. Additionally, in some embodiments the portal server is further adapted to provide user maturity score and user profiles to the third-party server or web site. Yet further, in some embodiments the advertising server is further adapted to provide advertisements to the third-party server for display to a particular user, based at least in part on a maturity score or user profile provided by the portal server.

According to a preferred embodiment of the invention, upon notification from the third-party server that a user has requested information pertaining to a particular product or class of products, the portal server selects from a plurality of users known or suspected to have such information, said selection based at least in part on available user maturity scores and user profiles pertaining to the plurality of users known or suspected to have such information.

In a preferred embodiment of the invention, an e-commerce system, comprising a portal server executing on a digital computer and coupled to a digital packet network and an analysis software executing on the server system or executing on another digital computer and adapted to communicate with the server across the digital packet network, is disclosed. According to the embodiment, the portal server is adapted to receive information from a user via the digital packet network, said information including at least a plurality of data elements pertaining to products owned, used, or sought by the user. Additionally, the received information is made available to the analysis software, and the analysis software computes a maturity score for the user based at least in part on the received information provided to the analysis software, said maturity score further being provided to the portal server. Finally, the portal server uses at least a maturity score to order a selection of information to be provided to the user, and at least some of the received information is made available to a plurality of external systems based at least in part on privacy settings established by or for the particular user.

BRIEF DESCRIPTION OF THE DRAWING FIGURES

DETAILED DESCRIPTION

Figure 1:
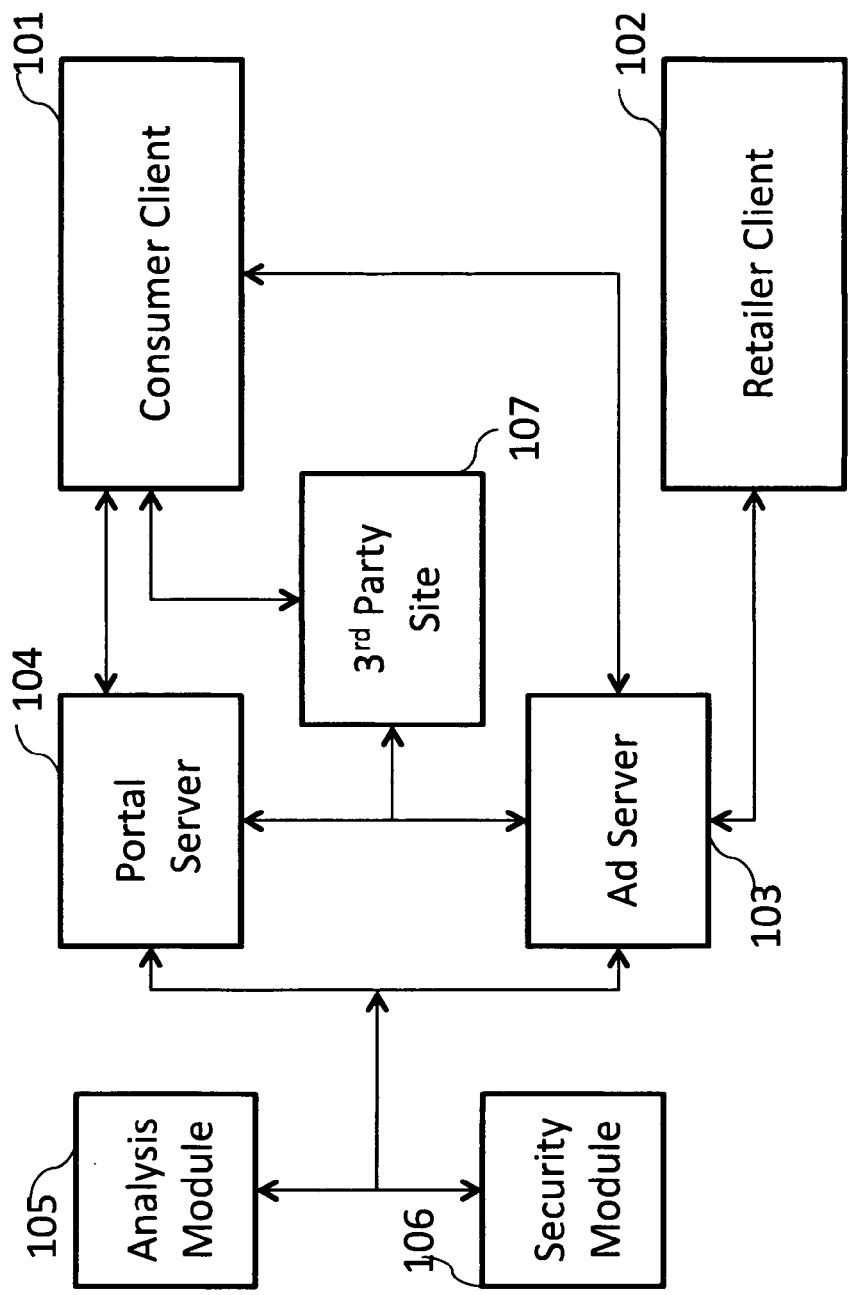
FIG. 1 is a block diagram of an embodiment of the invention in a web-based system.

A preferred embodiment of the invention, illustrated in FIG. 1, provides a web-based application platform that sits between consumers and retailers. Such a system may include a portal server 104 and an ad server 105. The portal server 104 passes an identifier to the consumer client 101 (which may be a browser operating on a personal computer, a mobile phone, a personal digital assistant, or any other Internet-connected device, or more generally any user interface device or application capable of connecting via the Internet or another network to a platform operating according to the invention). According to a preferred embodiment, consumers are identified through use of "cookies" (or other identifier technologies) stored on consumer client 101, as is well-known in the art, although in other embodiments consumers are identified using login credentials, biometrics, pass phrases or other general or device-specific verification methods common in the art; it should be appreciated that any method of identifying a user at least sufficiently to associate the user with previously-stored profile data may be used without departing from the scope of the invention. Once a user accessing a system of the invention via consumer client 101 is identified, portal server 104 collects data to build (or expand, if a profile already exists for a specific user) a dynamic consumer profile 601. The invention may include an analysis module 105 and a security module 106. In various embodiments these modules can reside within either the portal server 104, or the ad server 105, or they may reside separately. The portal server 104 also receives and stores feedback from consumer client 101 and builds a database of client details and preferences, product reviews and survey data. An embodiment of the invention stores and lists information on what specific items users purchased, prices they paid, which retailers they did business with, as well as storing customer feedback and review data. The portal server 104 in various embodiments identifies third party sites 107 that consumer clients 101 interact with. In an embodiment, analysis module 105 identifies specific tags associated with consumer profile 601 and communicates with ad server 103 to deliver deeply targeted advertisements that match specific characteristics associated with consumer profile 601. These can be delivered in some embodiments directly to third party sites users are currently visiting, or in various embodiments can send targeted advertisements directly to consumer client 101 or indirectly through ad placements in social network platforms and various sites that a consumer frequents.

Retailer client 102 can design product offers around detailed consumer profiles 601 and also can learn how to improve product quality and marketing effectiveness based on detailed customer review data accessible from portal server 104. An embodiment allows retailer clients 102 to tag specific ads, residing for example within ad server 103, with specific consumer profile 601 characteristics. In an embodiment these deeply targeted ads can be delivered to third party websites 107. In various embodiments the ad server 103 can access these third party sites 107 by use of a custom code or specialized cookie to identify consumer client 101 and deliver advertisements without exposing consumer profile 601 details to third party site 107. In an embodiment a user, using consumer client 101, visits a third party site, is identified by a central cookie and a relevant deep profile ad is delivered to consumer client 101. In an embodiment third party site 107 has no knowledge of what specific ads are delivered to any given user, keeping consumer clients anonymous on that end. In various embodiments the system allows a retailer client 102 who placed an advertisement to know exactly where the advertisement was placed and for which instance of consumer client 101 (that is, for which end user). Embodiments of the invention also track consumer client's 101 response to advertisements. For example, did a user click through the advertisement? If so, how far did a user go in playing video or clicking to deeper levels within the targeted advertisement? Did the targeted consumer client 101 request more information or access detailed product reviews from portal server 104? Another embodiment allows consumer client 101 to respond with specific customizable options like "not interested" or "want to know more" or "send more information" for example. Retailer clients 102 are able to measure effectiveness of individual ads and to follow up with prospective customers if they so desire, and consumer client profile 601 allows for that function. In an embodiment retailer client 102 may contact consumer client 101 directly when an associated consumer shows an interest in a deeply targeted ad if the consumer client has agreed to this option in constructing his profile. This contact could be made by e-mail, direct mail, telephone or other various methods available according to the art.

Consumer client 101 can access detailed product reviews and comparison tools from portal server 104 when researching potential purchases in various embodiments. A search for product reviews automatically updates consumer profile 601 and, in an embodiment, triggers ad server 103 to deliver deeply targeted advertisements on the web page being viewed. Ad server 103 in some embodiments also stores information for later delivery as consumer client 101 visits other third party sites or interacts in his social network pages.

Retailer client 102 can also utilize the platform in various embodiments for customer service interaction. Customers can be notified when basic warranties are due to expire and extended warranties can be offered. Product reviews and feedback information on client retailers' products can be accessed and analyzed by retailer clients. Information on recalls or solicitations for upgrades can be easily stored and disseminated. The platform provides a forum to facilitate long-term communication with customers who are consumer clients 101.

An embodiment of the invention includes a security module 206 to encrypt and protect data from third party sources. In some embodiments security module 206 is part of an application server, while in others security module 206 may be a stand-alone component. In an embodiment the platform allows consumer client 101 to choose certain levels of security. For example, a user may opt to have data encrypted with a platform key and UUID or in addition may opt to add a user password.

Figure 2:
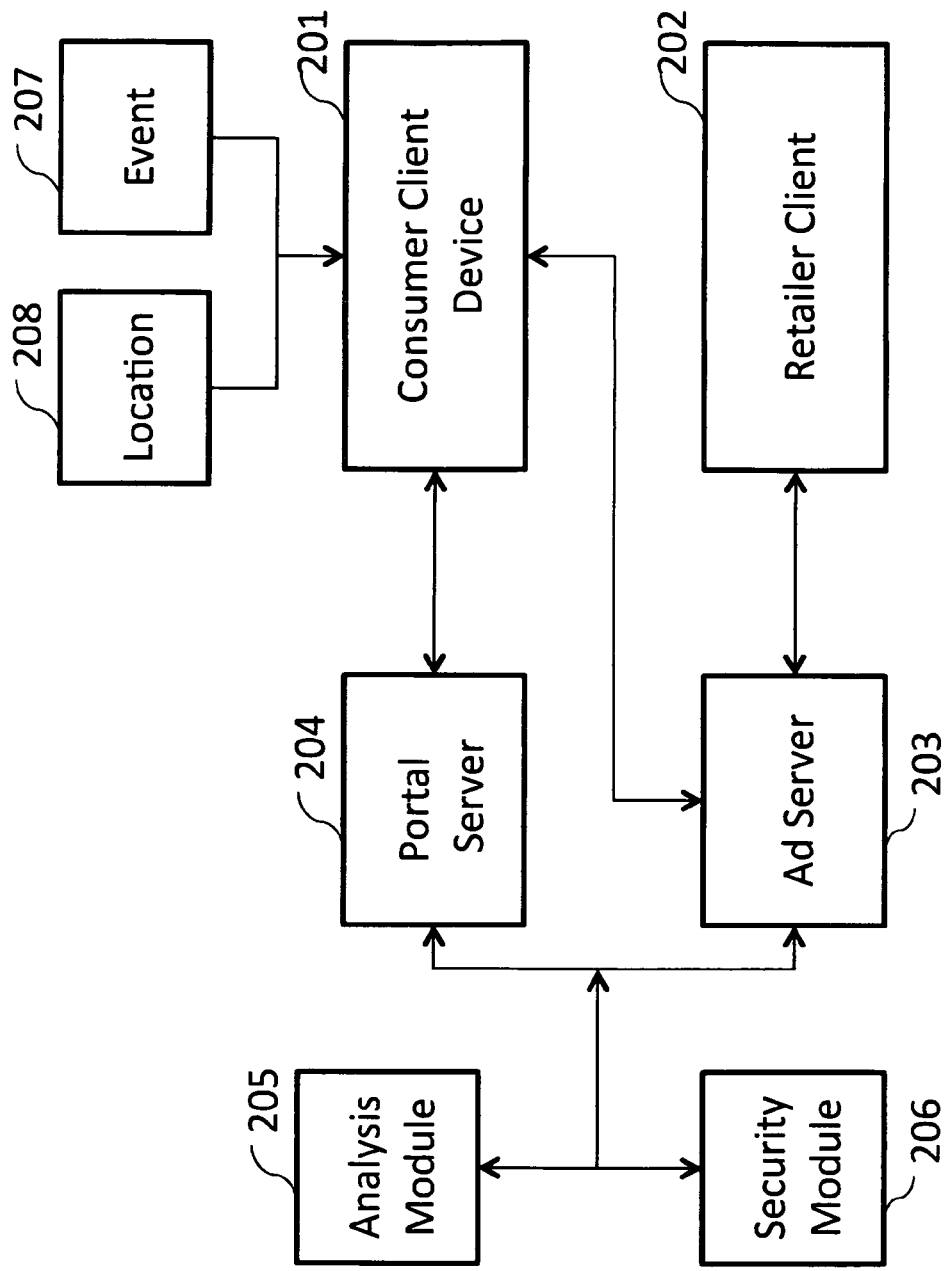
FIG. 2 is a block diagram of an embodiment of the invention using various device identifiers and event and location triggers.

FIG. 2 is a block diagram of an embodiment of the invention using various device identifiers and event and location triggers. Consumer client device 201 may be a mobile phone, PDA, e-reader device, iPad™, set top box, GPS device, or any other device capable of accessing the Internet or an equivalent network. Portal server 204 collects data to dynamically build consumer profiles 601 based on activities of identified consumers using consumer client devices 201. For example in an embodiment consumer client elects to register one or more consumer client devices 201 so that portal server 204 can identify the device 201. Consumer client device 201, according to various embodiments of the invention, could be a set top box or an iPad™ registered with a device ID so that portal server 204 can be aware of events 207 associated with consumer client device 201, or of attributes pertaining to consumer client device 201, such as the particular programming that consumer client device 201 employs or embodies, and can automatically update or modify consumer profile 601 as required. For example if consumer client device 201 is frequently tuned to sports programming, this information is provided to portal server 204 and may be used to update consumer profile 601. In this example, analysis module 205 identifies the particular consumer profile 601 as likely belonging to a user with an interest in sports programming, and matches tags from ad server 203 to trigger delivery of deep profile ads for sporting event tickets (as an example) to consumer client device 201. Another embodiment uses this enriched client profile analysis to deliver deep profile ads to favorite third party and social networking sites that a given client frequents. For example an enrolled consumer with a registered consumer client device 201 (such as a set top box for example) frequently receives pet programming and thus would be a candidate for deep profile ads from retailer clients 202 who have submitted ads to ad server 203 tagged with attributes specific to or associated with pets. Continuing this example, the attribute of "having an interest in pets" (for example) is added to consumer profile 601 based on the high frequency of programs viewed that are linked to this attribute and detected by portal server 204. In this example retailers such as PetsMart or PetMed Express could have offers or coupons delivered as part of a deeply targeted ad campaign directly to consumer client device 201 or to other sites frequented by a consumer at a later time or even by e-mail, regular mail or any other method available to advertisers.

In various embodiments event data 207 pertaining to a user, such as noting that the user visited a particular web site, downloaded music, watched a video, or engaged in gaming activities, on consumer client device 201, is used to enrich dynamic consumer profile 601. An example of one such embodiment would be to collect data on music, movie and other entertainment preferences as consumer client device 201 plays or downloads (this being the event 207 in this example) various entertainments to the device 201. In an embodiment analysis module 205 identifies an ad residing on ad server 203 intended for targeting consumer profiles 601 tagged with a preference for a particular genre of music (for example) offering concert tickets XXXXXX. In such a way only consumer clients with a known preference for a particular band or music style would be targeted by the ad server 203.

An embodiment of the invention includes collection of certain location data by the portal server 204 to dynamically update the consumer profile 601. In an embodiment the consumer client device 201 is equipped with a location module 208. The portal server 204 is apprised of the various geographic locations where an enrolled and identified consumer client device 201 is being used. In an embodiment the analysis module 205 matches tags on the consumer profile 601 indicating that the consumer has a preference for Italian food (based on previous purchases tracked by the system and/or consumer input to the profile) with ads tagged with geographic location data designed to target such consumers. In an embodiment the ad server 203 can now send a deeply targeted ad for an Italian restaurant from a retailer client 202 that resides in the general location of the consumer client device directly to that device. In another embodiment the invention "knows" that the consumer client prefers Italian food and "knows" the geographic area he frequents and sends deeply targeted ads by way of the ad server 203 to the consumer client's social networking sites, favorite third party sites or directly by email or regular mail. An embodiment of the invention would allow deeply targeted delivery of such ads to enrolled clients traveling to new areas. Since the portal server is informed of the client's current location automatically and "knows" the clients preferences in the dynamic consumer profile 601 the analysis module 205 can compare with retailer client 202 data residing in the ad server 203 to deliver deeply targeted ads to the traveling consumer client's device 201 for products and services she may be interested in consuming in her current geographical location.

An embodiment of the invention includes a security module 206 to protect location, event data and other profile data from being independently used or accessed by third party networks. In some embodiments the security module 206 is part of the application server and in others may be a stand-alone component.

Figure 3:
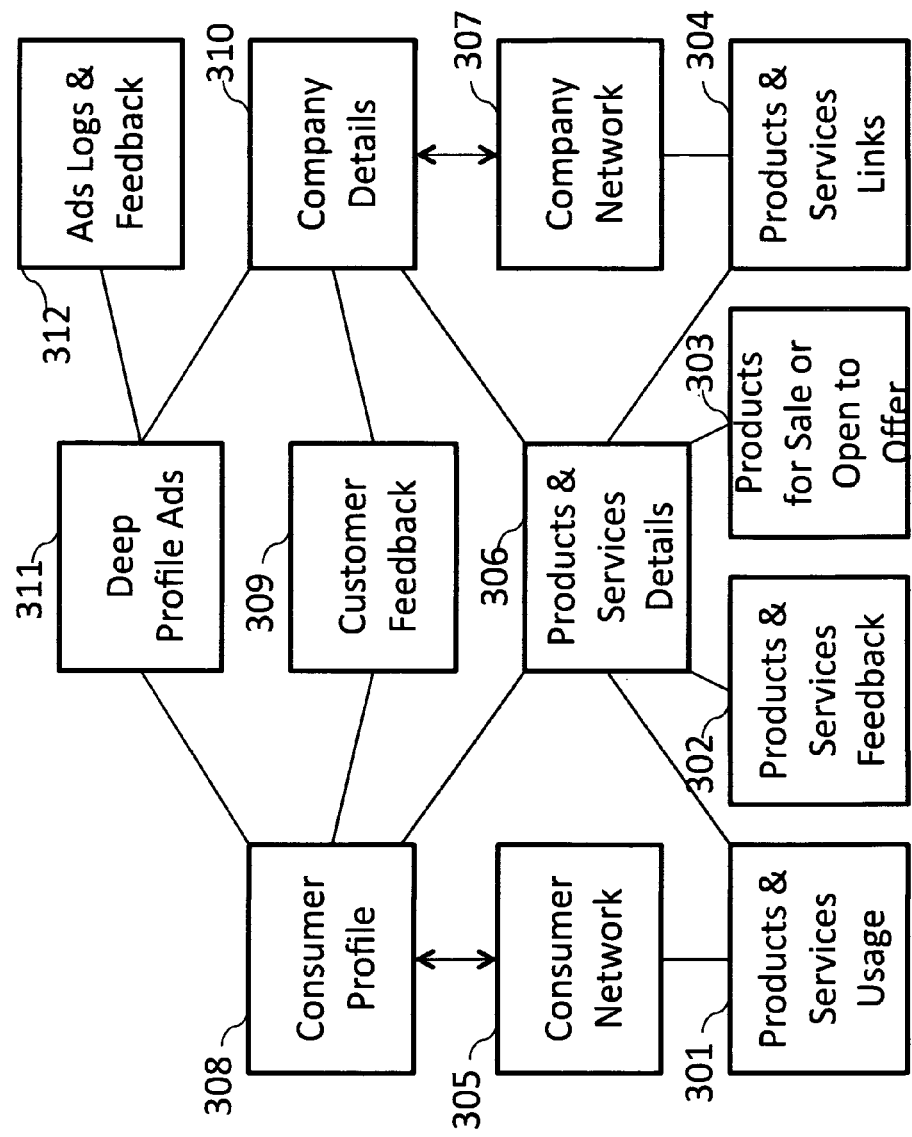
FIG. 3 is a schematic overview of data architecture in an embodiment.

FIG. 3 is schematic overview of a data architecture associated with an embodiment. An embodiment of the invention links a consumer network 305 to a company network 307 enabling companies to deliver deeply targeted advertisements 311 to consumers and to increase the level of customer service by facilitating customer feedback 309 and delivering detailed product reviews and comparison tools. In an embodiment the entire data may be stored in a single data base while in other embodiments the data elements are widely scattered among individual data bases.

Data on what products and services consumers purchase and use 301 is stored and continually updated. Feedback from these same consumers 302 about the products and services they purchase and use is collected and updated. Products that either retailers or consumers have for sale or open to offer 303 are also filed in a data base. Links to detailed information on products and services 304 are also kept updated. These four categories (301, 302, 303, and 304) are maintained and filed under the heading of product and services details 306 and receive input from both the consumer network 305 and the company network 307.

The consumer profile 308 is a dynamic data base built over time by active consumer participation and also passively by tracking purchases, contacts, social networks, event and location triggers and additional information in various embodiments. This data base is kept current and enriched continually as the consumer client navigates within his consumer network 305.

Company details 310 are also dynamic and built from direct company input as well as, over time, passively from actions within the company network 307, product and sales data, warranty information, customer feedback and interaction, ad profile data and other data in various embodiments. Companies 310 determine desired consumer profile 308 attributes for the specific products and services they offer in order to produce the deep profile ads 311 for delivery to specific consumers. In an embodiment of the invention the consumer profile 308 data base is accessible in some form so companies can tailor their marketing campaigns to certain demographic or behavioral characteristics by producing specific deep profile ads 311. Data is collected in an ads logs and feedback file 312 that in various embodiments can facilitate monetization and assess effectiveness of various advertising campaigns. For example click through rates, actual sales, requests for more information or for product comparison tools would be logged here in addition to data showing specific consumer profiles 308 that were targeted and had actual deep profile ads delivered.

Figure 4:
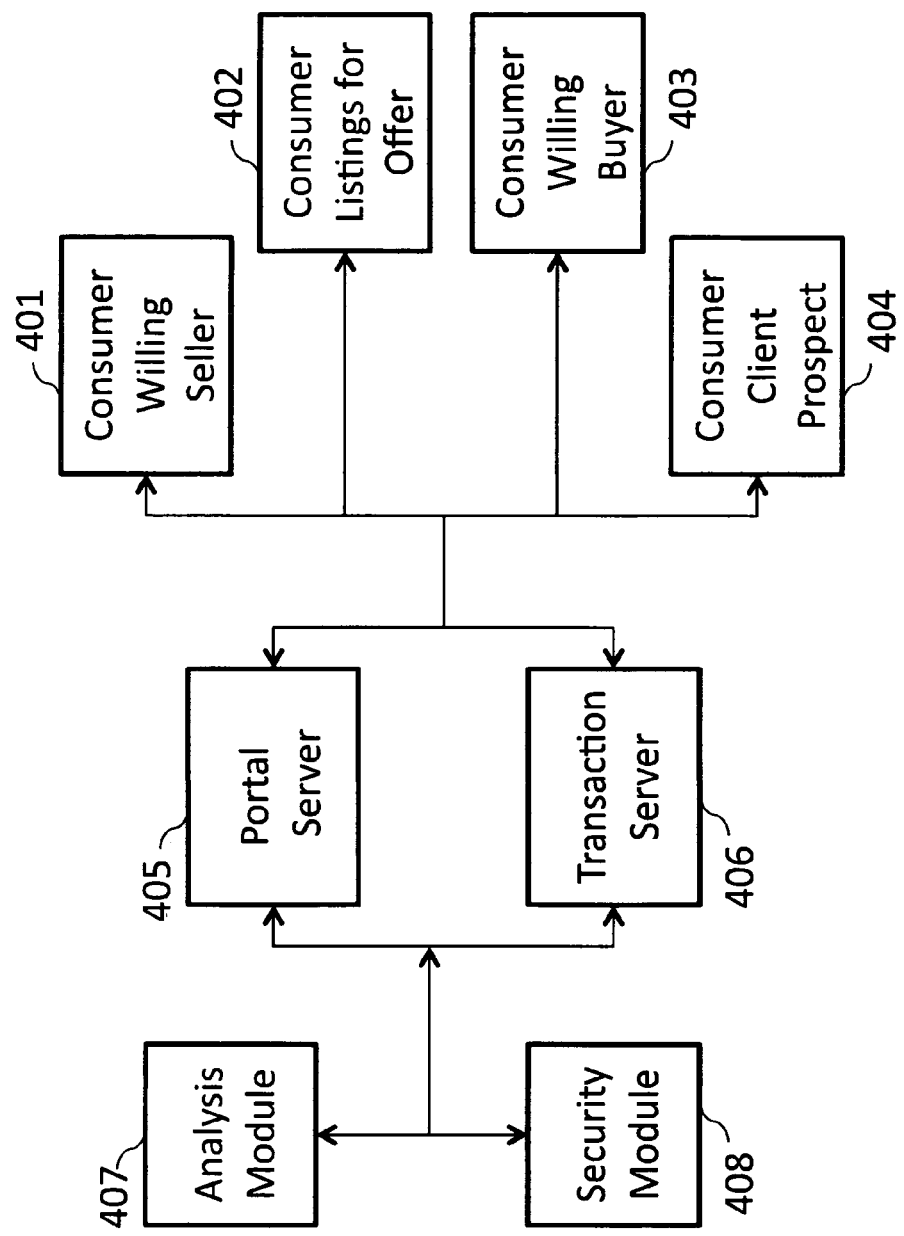
FIG. 4 illustrates an embodiment with a transaction server showing sales functions.

FIG. 4 illustrates an embodiment with a transaction server showing sales functions. In various embodiments, the invention allows consumer clients to become sellers and thus consumer client devices 101 include, in some embodiments, transaction server 406, which facilitates transactions between consumer clients. An enrolled consumer client who is a willing seller 401 posts specific items he wants to sell. Other consumer clients may, in an embodiment, list items 402 they own and are willing to consider offers from other consumer clients in a network who might be willing to pay for such items. For example, a model train or antique doll enthusiast may list items they treasure in their own collection and might be willing to sell if they received a good offer from another collector who found their listing in a network. A consumer client may choose to list items open for offer 402 that they are willing to part with, even potentially in situations where the consumer is not inclined to actively attempt to sell the item (for example, on an auction site.

Embodiments of the invention also allow for consumer clients to list items they want to buy 403 and thus to solicit sellers from other consumer clients in a network. Consumer client prospects 404 in some embodiments are notified in one or more ways, based on their individual consumer profile characteristics that might indicate an interest in a certain product category or who have purchased or reviewed products in that category. In an embodiment, analysis module 407 matches the consumer profile characteristics with the product category from willing sellers 401 and consumer listings 402. The security module 408 protects individual profile information and guards the identity of individuals based on client preferences in various embodiments. In an embodiment the security module 408 also protects financial information disclosed in the transaction server 406 by various methods common in the art.

Figure 5:
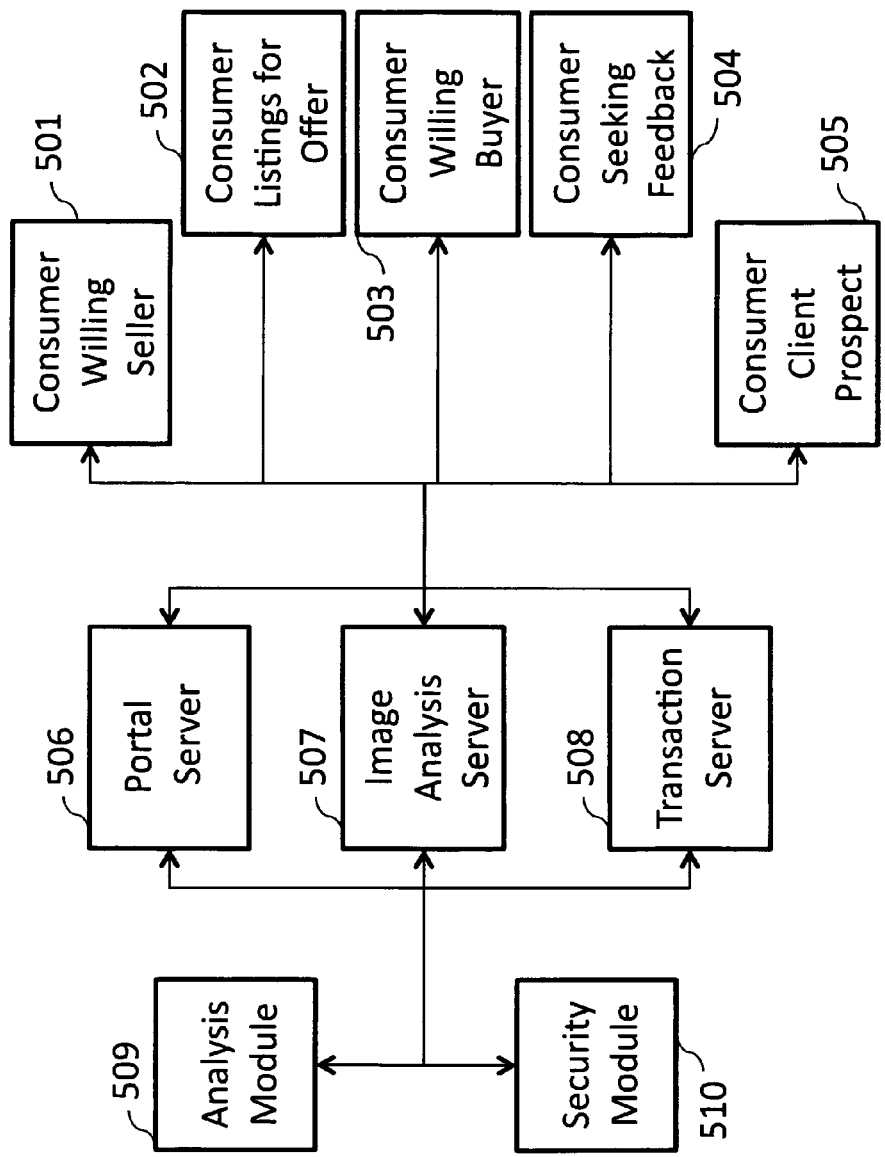
FIG. 5 is a block diagram showing an embodiment of the invention that includes an image analysis server to facilitate sales functions.

FIG. 5 is a block diagram showing an embodiment of the invention that includes an image analysis server 507 to facilitate sales driving functions. In an embodiment a consumer who is a willing potential buyer 503 can submit a picture of an item (and potentially some additional data) they are interested in purchasing. The image analysis server 507 identifies a specific item and product category using optical character recognition (OCR), digital image recognition technology, or other technologies common to the art. The analysis module 509 matches current listings by consumers who are willing sellers 501 and consumer profile data in portal server 506, and solicits and notifies potential sellers. These potential sellers could be consumers who have listed items for offer 502, consumers who have listed items for sale 501 or consumer client prospects 505 who have consumer profile characteristics matching the product category determined by the image analysis server 507 (that is, in some embodiments, opportunities to sell an item may be made to participants who did not explicitly offer their product for sale, but whom analysis module 509 concludes may be willing to sell if give the opportunity). Similarly, in another embodiment, a consumer seeking feedback 504 can submit an image of an item they are seeking more information about or wanting to determine its market value. Once image analysis server 507 identifies the item, analysis module 509 identifies consumer profiles that have in the past (or are likely to) submitted feedback for that category, have similar products listed for sale 501 or offer 502, or who have purchased similar products in the past, and then retrieves detailed product reviews and comparison tools. Various embodiments solicit fresh feedback from individuals with appropriate consumer profiles and can deliver all reviews, new feedback and product comparison tools to the consumer requesting feedback 504. In an embodiment it takes only submission of a photo from a mobile phone or PDA for example for an enrolled client to initiate this process and receive useful feedback and potential offers from interested sellers. In other embodiments this system can also be networked with retailer clients 102 and ad servers 103 so that retailer clients 102 can deliver deeply targeted ads to consumer clients 101 who are seeking information on a product category they service as the submission of a photo and request for information becomes part of the dynamic consumer profile 601. In various embodiments, financial transactions between consumer clients are handled within the system through a transaction server 508, and security is maintained by security module 510.

Figure 6:
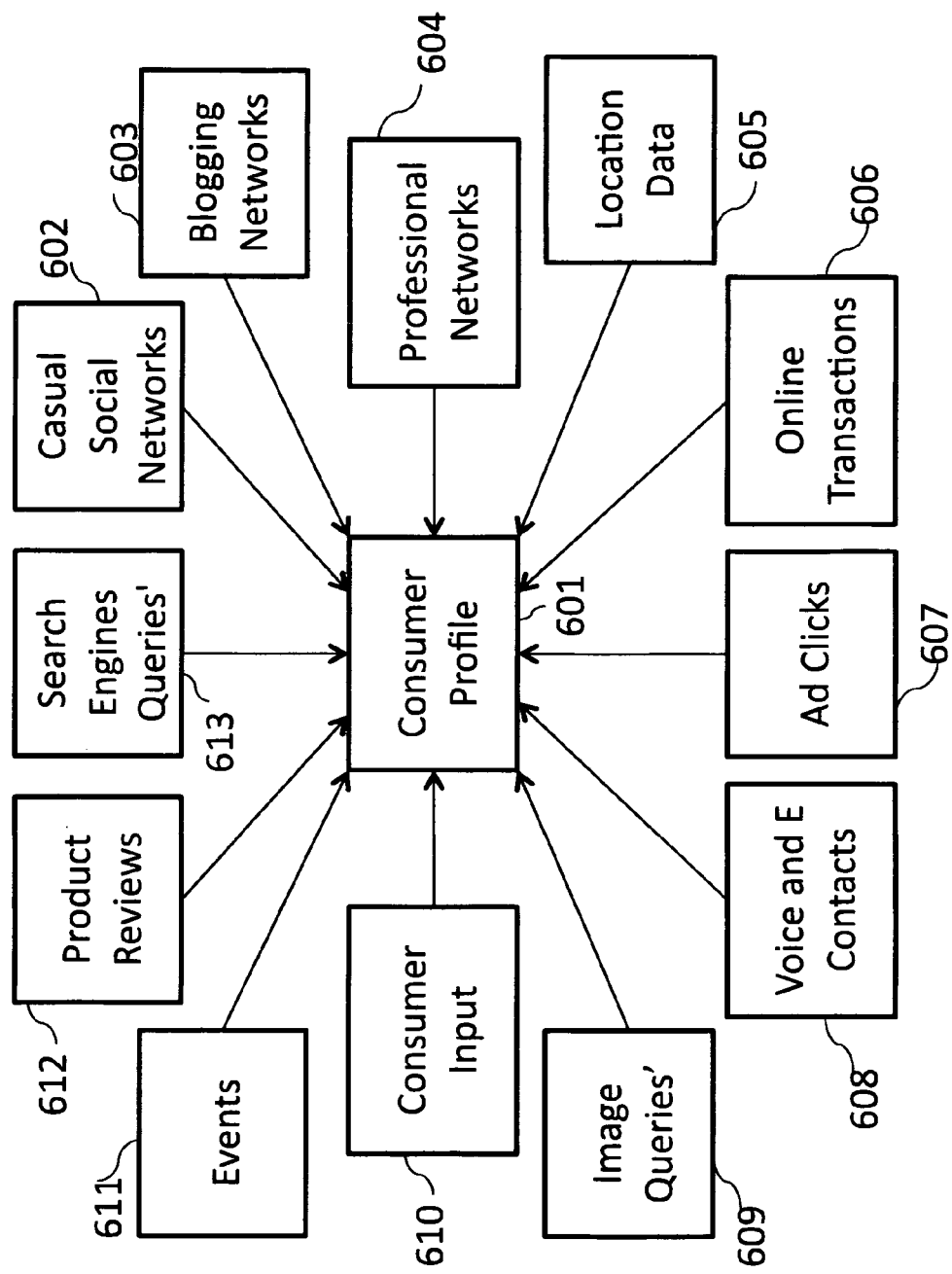
FIG. 6 is a schematic of an embodiment of the invention illustrating inputs to the consumer profile.
Figure 7:
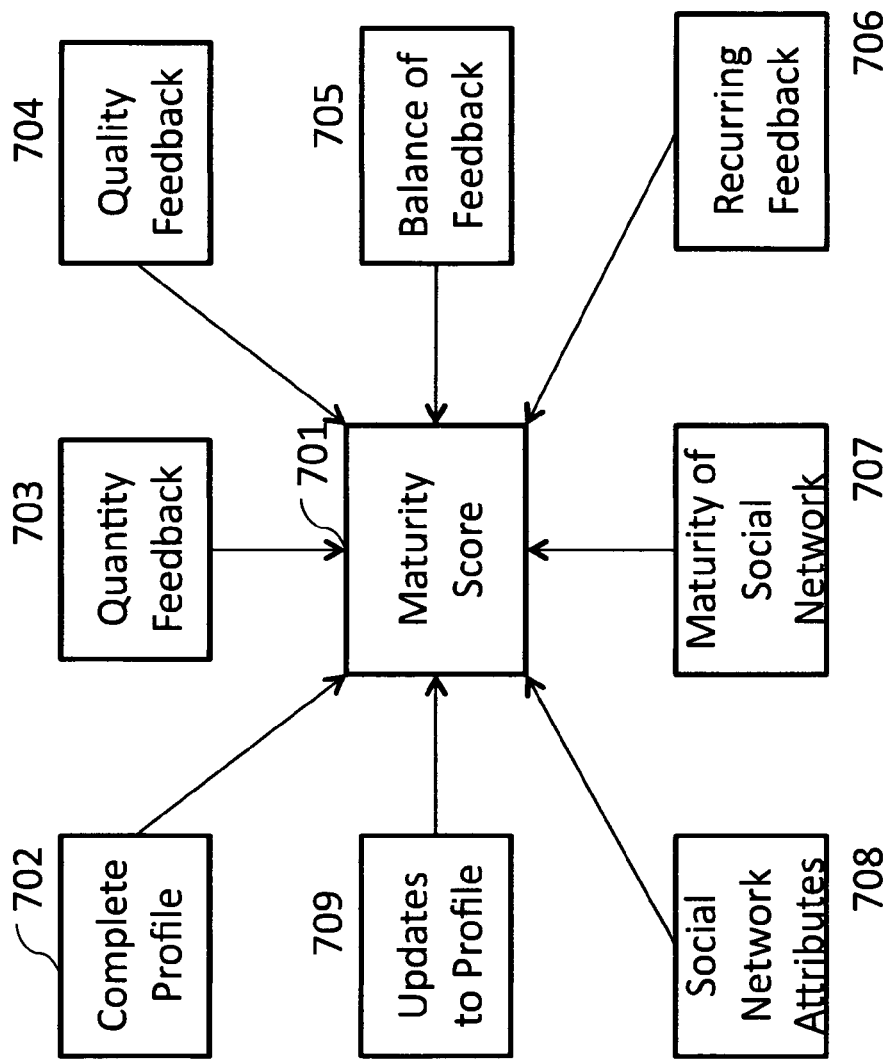
FIG. 7 illustrates an embodiment whereby a maturity score is calculated for the consumer profile based on various inputs.

FIG. 6 is schematic of an embodiment of the invention illustrating inputs to consumer profile 601. Consumer profile 601 is dynamic in that it is continuously updated over time by both passive and active participation via consumer client 101. In an embodiment all data fields making up consumer profile 601 have a relevance date tag. Various applications can then differentiate between data that is most relevant and old data that may be of less relevance.

Active consumer input 610 begins when the client enrolls in the program. In various embodiments basic information is obtained such as client demographics, client likes and dislikes, professional interests, leisure activities and hobbies, products they have and use and products they desire. In an embodiment consumer client 101 is regularly queried for additional bits of up to date information. This consumer input 610 might be obtained by regularly sending short polls by email and incentivizing clients to respond by enhancing their maturity score and thus, for example, entitling them to discounts or rewards. An example of such a query would be a short questionnaire on what type of mobile phone or PDA a client uses. Do they like it? Do they plan to upgrade? If so to what brand or model? Do they have a mobile broadband plan? Are they happy with their carrier? Do they get dropped calls? And so on. In order to ascertain that certain data is current, an embodiment of the invention periodically questions consumer client 101 with short surveys to prompt the corresponding client to verify if information is current, or to change outdated information. In various embodiments consumer client 101 also can select security settings, options to include location data and register mobile devices, options to receive direct solicitations form retailer clients 102, etc. In an embodiment consumer client 101 can access system 610 to actively update information and settings in the consumer profile 601 at any time.

Embodiments of the invention also provide for passively updating the consumer profile 601. As the consumer client goes about his normal networking various embodiments identify social 602, professional 604, and blogging 603 network sites frequented by a consumer, and inputs this information into the corresponding consumer profile 601. Examples of such sites are Facebook™, MySpace™, Linkedin™, Twitter™, Google™ Buzz, etc. An embodiment of the invention allows placement of deeply targeted ads intended for a specific consumer client 101 on pages of sites frequented by that client. An embodiment similarly identifies search engine queries 613 conducted by, and Internet sites visited by, a given consumer, and updates consumer profile 601 dynamically as to the corresponding consumer's interests and networks indicated thereby. Another embodiment identifies other enrolled consumer clients within social networks 602, 603, 604. An embodiment solicits non-enrolled "friends" or followers" in a consumer client's social network and may offer reward or loyalty points or improved maturity scores for personal references from consumer client 101. For example, in an embodiment consumer profile 601 receives a higher maturity score as more individuals within the corresponding client's social networks themselves become members and use consumer clients 101. Various embodiments include applications that interface directly with social networking sites 602, 603, 604. Similarly consumer client contacts such as voice, e-mail or instant messaging contacts 608 could be solicited for enrollment and rewards offered as the consumer client's enrolled network grows. In an embodiment the consumer client can adjust settings or opt out of certain data mining functions at any time.

An embodiment of the invention includes location data 208 that is updated passively as consumer client 101 uses a registered device 201 in various geographic locations. Consumer profile 601 is updated dynamically so that deeply targeted ads can be delivered based on either current location or locations frequented by a consumer using consumer client 101.

In an embodiment, any online transactions 606 by a consumer client trigger collection of new real time data delivery to update the corresponding consumer profile 601. Information on purchases such as specific items purchased, price paid, retailer information, etc are automatically collected. This information becomes a part of consumer profile 601. In an embodiment, such new information can trigger requests for a detailed product review or query of a particular product, or asking for new consumer input 610 at a later time or times, which further enriches consumer profile 601. Participation of consumers in selling or auction platforms such as Ebay™ or Amazon™ is noted by various embodiments and products listed or purchased and transactions made on such platforms by a client trigger automatic updates to consumer profile 601. The various companies a client does business with are recorded as part of consumer profile 601, making it possible for retailer clients 102 to easily identify and solicit feedback from consumer clients 101.

Embodiments of the invention that include an image analyzer 507 update consumer profile 601 as submitted images are identified. Other embodiments' record requests for product reviews 612 and comparison tools in consumer profile 601.

Various event data 611 may in some embodiments trigger a consumer profile update. For example, a consumer's response to certain ads may trigger an update to consumer profile 601 in various embodiments. When a client clicks through an ad, potential interest in that product or service is noted in the corresponding consumer client profile 601. In some embodiments, a system according to the invention detects if a video ad was played through, or if an ad was clicked through (sometimes noting various levels of click through), and updates consumer client profile 601 appropriately. The clicking of the ad is considered an event 611 resulting in new data collected in consumer profile 601. A registered consumer client device 201 such as a set top box or an iPad™ may be used regularly at certain times for certain program favorites. In this example both the time of day a device is used and the program category or genre of music played are noted and consumer profile 601 is updated. As an example a consumer client 101 with a registered device 201 routinely watches Fox Business network program at 4 PM Monday through Friday. Consumer profile 601 is updated with data that tags both the interest in business programming and the time of day the client is routinely using the device. This data within consumer profile 601 may be matched with an appropriate targeted ad from a retailer client that is targeting consumers with an interest in business or finance.

An embodiment of the invention solicits feedback from consumers using consumer client 101 on all products and services purchased. This feedback can be in the form of simple queries or a more detailed product review 612. Various embodiments provide incentives for consumer clients who take the time to do detailed product reviews 612. At certain time intervals new queries are sent to reviewers to allow for updates so consumer reviews can be dynamically updated over the lifecycle of the product. For example, a consumer buys an iPod Touch™ and gives a product review using consumer client 101. The user is queried again in three months to update previously supplied feedback, and then repeatedly queried every six months until the user indicates the product is no longer used. In an embodiment these queries can be consolidated and sent as a simple survey to cover multiple product reviews.

In an embodiment every user of the platform gets a maturity score 701 that is updated continually based on changes made in consumer profile 601. This may include both consumer clients 101 and retailer clients 102. Maturity scores are used to calculate impact of a user's profile and of any feedback provided by the user. In general, a higher maturity score indicates a richer and more up-to-date consumer profile that provides superior data for the accurate placement of deeply targeted ads and more trusted product reviews. In various embodiments the maturity score 701 is calculated based on the completeness of the client profile 702 and the quantity of feedback 703. Consumer clients who answer surveys and queries in a timely manner boost their maturity score 701 each time the consumer profile 601 is updated. Clients' who take the time to provide detailed product reviews 704 in various embodiments, receive extra maturity points for quality of their feedback. Another embodiment considers the balance of feedback 705 given by a consumer client in calculating a maturity score 701. For example, a client who reports balanced criticisms would receive a higher score than a client who only gives negative feedback. Perhaps such a client is only motivated to take the time for a review when he is upset with a product and has a vindictive personality. Such a review would be less trusted and reflected by a lower maturity score 701. Clients also may receive maturity points each time they provide recurring feedback 706 in providing timely answers to periodic queries that follow up product reviews over time.

Embodiments of the invention interact with consumer clients' social networks 708 and give maturity points based on various attributes of these networks. Examples of such attributes in an embodiment would be the number of "friends" or "followers", mean age of "friends" or "followers" or general demographic information on the pool of "friends" or "followers". Such information may grant a higher maturity score for clients whose social networking peers average 35 years of age versus 18 years. Another example would give a higher maturity score for a social network with a higher average educational demographic attribute. An embodiment gives a maturity score to an actual social network 707 based on total number of participants, demographics, activity levels and number of clients within the network.

An embodiment of the invention also considers the number of participating consumer clients 101 (those enrolled in the system) within a given consumer client's individual social network, potentially also taking into account the overall maturity scores 701 of those consumer clients within social network group 707. Various embodiments recognize the influences a consumer client may have within her social network and gives maturity points for solicitations to enroll others and additional points for each individual who completes enrollment as a consumer client 101 in the system.

Embodiments of the invention dynamically update maturity score 701 as both active and passive updates 709 are made to consumer profile 601. For example in an embodiment utilizing a locator module 208, each time new device location data is added to consumer profile 601, the maturity score is incrementally raised. An embodiment allowing consumer profiles 601 to be updated by search engine queries 613 provides passive input that is reflected by an ever-increasing maturity score 701. This is one incentive for consumer clients to elect to allow various data mining functions. In various embodiments discounts or privileges may be granted at certain milestones as a maturity score rises.

In another preferred embodiment, users are allowed to control the degree of privacy maintained by portal server 506 and other components of the system according to the invention. Specifically, users are permitted to specify that specific information about them is maintained as private, allowing only a maturity score 701 to be viewed or used by third parties. Users may also, according to the invention, be allowed to specify a plurality of individuals, organizations, companies, or groups to which they are willing to provide more detailed information. In various embodiments, users are allowed to identify specific types of information, for example phone numbers, addresses, preferences, products owned or desired, demographic segments, recent activities, and the like, and to specify what level of privacy is to be maintained by portal server 506 (or other elements of the invention) for each specific type (or even for each specific piece of information, as illustrated for example by providing different privacy settings for a mobile phone used socially and a business phone used only professionally). It will be appreciated by one having ordinary skill in the art that there are many ways in which a system according to the invention could physically carry out this privacy function. For example, an application programming interface (API) according to the invention could allow for a third party online service to provide to portal server 506 a plurality of sets of electing user id, information type id, information instance id, other user or group id, and a privacy setting describing the privacy to be maintained when disclosing information about the electing user to the other user or group concerning a particular information instance or information type.

In another embodiment, portal server 506 may directly offer a configuration page to end users that allows them, among other things, to specify their privacy settings in any desired level of detail. What is important is that portal server 506 is thus enabled to act as a trusted middleman or information intermediary, and thus to make it possible for consumers to enjoy greater value from online services without having to sacrifice their privacy. That is, the ability of an online service operating according to the invention to store information about millions of users' product holdings, product experiences, future product purchase plans, and online shopping behavior (to name a small set of the possible types of information handled by portal server 506 as discussed above), and to use this information to computer maturity scores 701 and profiles 601 for individuals and groups from among the millions of consumers, and to use these scores and profiles to provide valuable information to the same and other users, while protecting the personal information of each of the millions of users according to rules established by each of the users (of course, with the optional provision of default settings so that users who wish to bypass setting security rules are still protected in a default fashion; additionally, preconfigured "security bundles" may be provided according to the invention to facilitate users' rapidly setting up typical security profiles), is a principal object and advantage of the present invention.

According to the invention, information pertaining to desired (or default) privacy settings for users may be stored as part of user personal profiles 601, or it may be stored as a separate database of table of data or as part of another database (for instance, a configuration database). It will be appreciated that the precise location of storage of such data is not critical to the inventive concept, which is that a single trusted intermediary is able, according to the invention, to aggregate private information about many products' ownership and usage in order to facilitate the exchange of information among users, without any product manufacturer or seller having access to any user data beyond what each user allows. Such an arrangement is valuable to users and merchants (such as manufacturers and vendors) alike, as it encourages a level of information exchange and aggregation which normally would not take place in an untrusted environment, and thereby allows users to better evaluate or to find desired products and services by using input from many other users, thus also driving more sales for manufacturers (at least for products that are valued by users!).

All of the embodiments outlined in this disclosure are exemplary in nature and should not be construed as limitations of the invention except as claimed below.

What is claimed is:

1. A method for ecommerce, comprising the steps of:
   (a) receiving, by a computer-based system, from a user of a consumer device, information pertaining to a plurality of products owned, used or sought by the user from the consumer device;
   (b) computing, by the computer-based system, a maturity score based at least on: completeness of a user profile associated with the user, active and passive user profile updates received over time, quantity, quality, balance and recurrence of product feedback provided by the user, social media network attributes associated with the user and maturity of social media network associated with the user;
   (c) selecting, by the computer-based system, an advertisement or content item from a plurality of available advertisements or content items based on the user's maturity score; and
   (d) transmitting, by the computer-based system, the selected advertisement or content item to the consumer device associated with the user.

2. An ecommerce system comprising:
a computer configured to:
(a) receive, from a user of a consumer device, information pertaining to a plurality of products owned, used or sought by the user from the consumer device;
(b) compute a maturity score based at least on: completeness of a user profile associated with the user, active and passive user profile updates received over time, quantity, quality, balance and recurrence of product feedback provided by the user, social media network attributes associated with the user and maturity of social media network associated with the user;
(c) select an advertisement or content item from a plurality of available advertisements or content items based on the user's maturity score; and
(d) transmit the selected advertisement or content item to the consumer device associated with the user.

* * * * *